United States Patent [19]

Yoshimura et al.

[11] Patent Number: 5,602,826
[45] Date of Patent: Feb. 11, 1997

[54] TEST SYSTEM IN AN ATM SYSTEM

[75] Inventors: Shuji Yoshimura; Shiro Uriu; Satoshi Kakuma, all of Kanagawa, Japan

[73] Assignee: Fujitsu Limited, Kanagawa, Japan

[21] Appl. No.: 565,048

[22] Filed: Nov. 30, 1995

Related U.S. Application Data

[63] Continuation of Ser. No. 183,600, Jan. 19, 1994, abandoned.

[30] Foreign Application Priority Data

Jan. 19, 1993 [JP] Japan .................................. 5-006487
Mar. 19, 1993 [JP] Japan .................................. 5-060740

[51] Int. Cl.$^6$ ........................................................ H04J 3/14
[52] U.S. Cl. ........................... 370/248; 370/395; 371/20.4
[58] Field of Search .............................. 370/13, 14, 60, 370/60.1, 94.1, 94.2; 371/20.1, 20.4

[56] References Cited

U.S. PATENT DOCUMENTS 5,251,204 10/1993 Izawa et al. ............................ 370/15
5,257,311 10/1993 Naito et al. ........................... 370/60 X
5,274,641 12/1993 Shobatake et al. ..................... 370/94.1
5,299,209 3/1994 Murayama et al. .................... 370/60 X
5,313,453 5/1994 Uchida et al. ........................... 370/13

*Primary Examiner*—Douglas W. Olms
*Assistant Examiner*—Russell W. Blum

[57] ABSTRACT

A test system exactly checks the integrity of data in an ATM system, and generates a test cell of a desired band. In the first aspect of the system in which data stored in an ATM cell are transmitted in an 8-bit parallel format in the ATM system, a test cell generating device connected to an input line outputs a test cell having 1 in all of the eight bits or having zero in all of the eight bits, and the test cell confirming device connected to an output line of the ATM switch detects the above described data. In the second aspect, the test cell generating device provided in an input trunk outputs a test cell of a desired band based on a ratio between two optional integers N and n (N≧n), the state of a buffer of the ATM switch is monitored, and a load test is conducted to determine whether or not any cell has been destroyed.

12 Claims, 15 Drawing Sheets

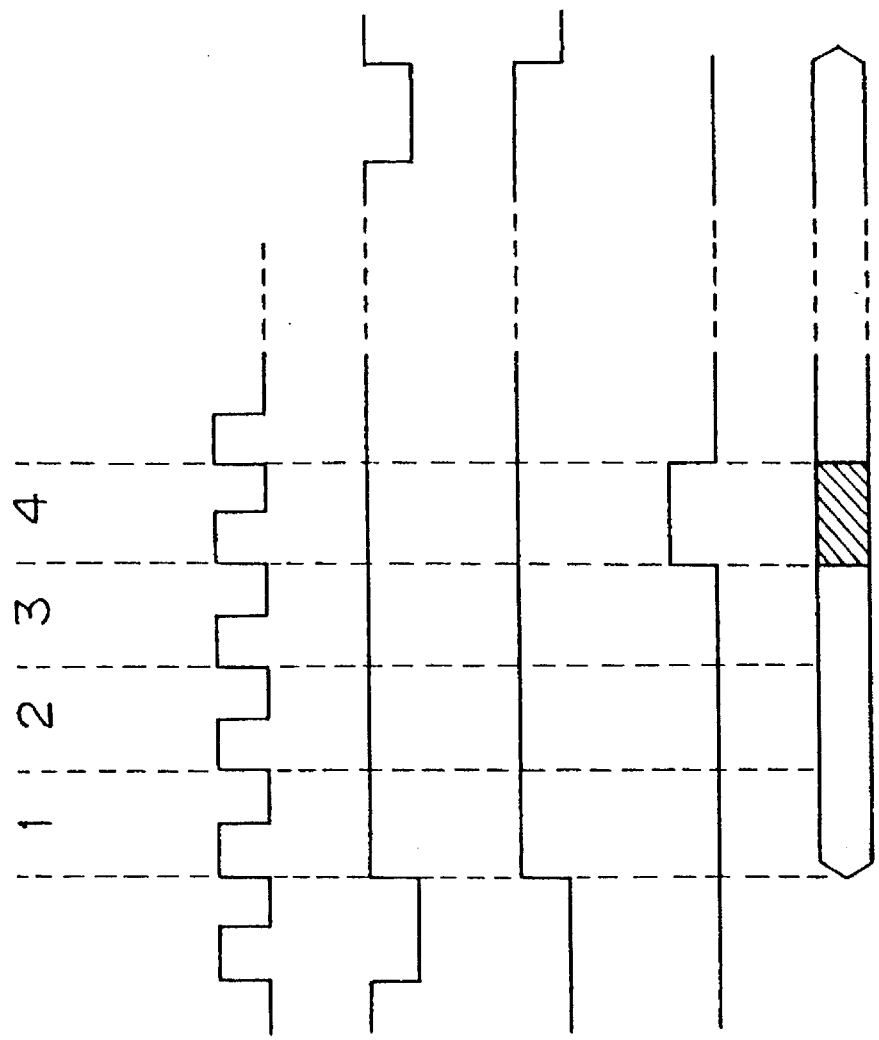

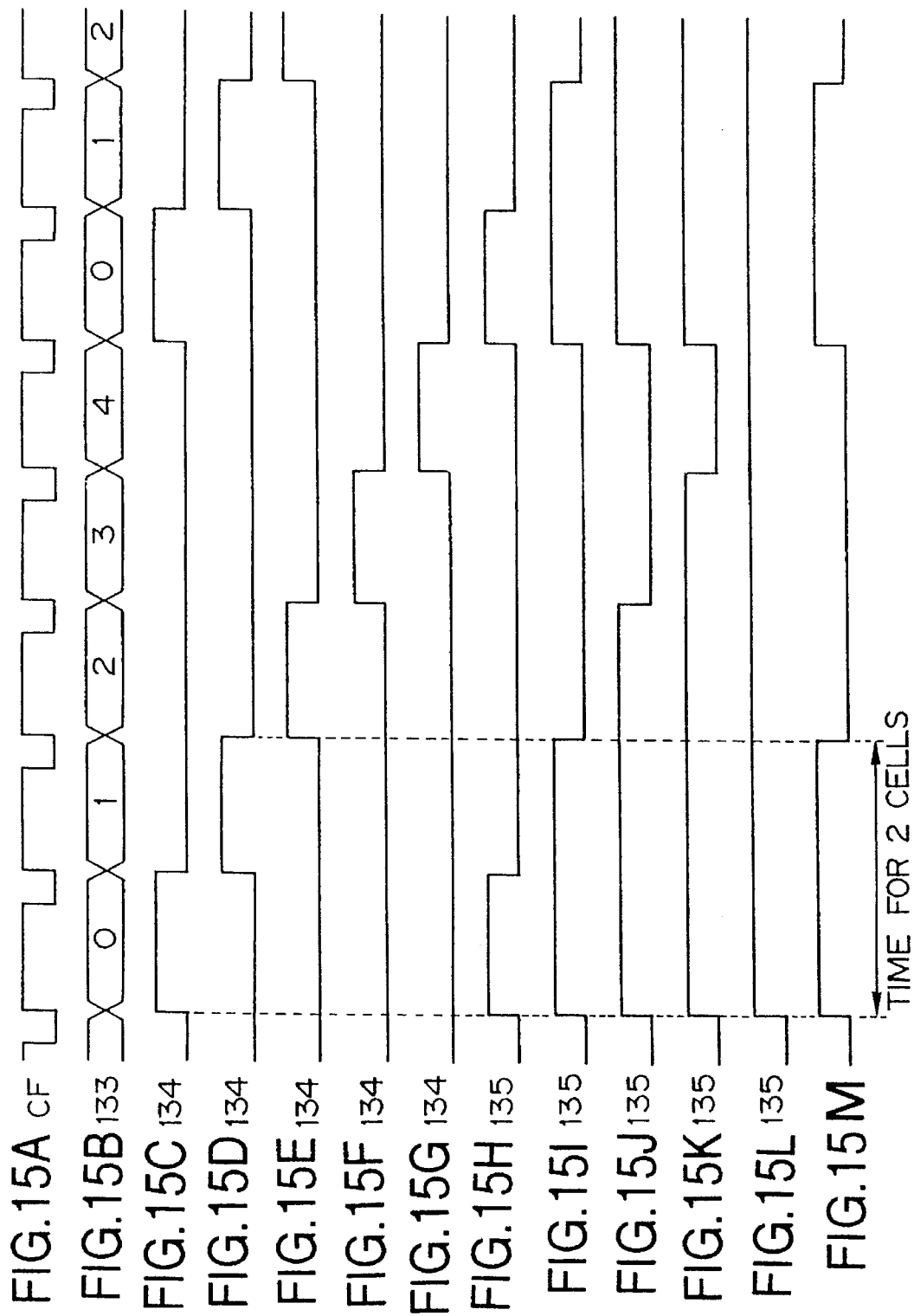

TEST SYSTEM IN AN ATM SYSTEM

This is a continuation of application Ser. No. 08/183,600, filed Jan. 19, 1994 now abandoned.

BACKGROUND OF THE INVENTION

1. Field of the Invention

The present invention relates to a test system for use in an asynchronous transmission mode (ATM) system, and more specifically to a test system for checking the integrity of data transmitted in ATM cells and for testing a switching unit by transmitting a test cell having an optional band.

2. Description of the Related Art

In an ATM, data can be processed at a low speed of several kbps through digital telephone, etc., and at a high speed of several hundred Mbps in the transmission of dynamic image data.

In the ATM, data are segmented for a fixed length of 48 bytes, and transmitted with 5-byte control information referred to as a header. The 53-byte information block is referred to as a cell. Since the ATM cell is fixed in length, detecting a header position also detects succeeding header information and information to be transmitted.

In the ATM, cells are transmitted at predetermined intervals. If data are transmitted at a high speed, the number of significant cells transmitted per unit time is increased, whereas in a low speed transmission, the number of significant cells transmitted per unit time is decreased by issuing idle cells when significant cells are not transmitted. An idle cell can be identified through a specific header pattern. In a network, the idle cells are discarded when user data are multiplexed so that only significant cells can be extracted. Thus, significant cells can be transmitted at an optional speed in the ATM.

FIG. 1 shows a rough configuration of the ATM system containing an ATM switching unit. In FIG. 1, if subscriber A transmits data to subscriber B, an ATM cell outputted by subscriber A is transmitted as an optical signal via an optical fiber line, converted to an electric signal by an optic-electrical converting unit 1, and applied to a cell synchronizing unit 2.

The cell synchronizing unit 2 synchronizes cells and generates a pulse signal indicating the timing of the heading cell. A header error control (HEC) checks for errors in the contents in the header of a cell.

Once the cells have been synchronized by the cell synchronizing unit 2, they can be processed individually, and each of the cells is applied to a switch 5 through a subscriber interface 3 and a multiplexer 4. The switch 5 switches the cells in a route according to the control information in the header of a cell, and applies them to subscriber B.

The cells outputted from the switch 5 are applied to an electro-optical converting unit 14 through a demultiplexer 11, subscriber interface 12, and synchronization signal providing unit 13.

The above described ATM system performs a serial/parallel conversion in the cell synchronizing unit 2, and transmits data in cells in, for example, a parallel 8-bit format. Thus, a parallel/serial conversion is performed by the synchronization signal providing unit 13, and the data are transmitted as optical signals in a serial format again.

Various tests are conducted to confirm the operation of the above described ATM system. For example, conducted is a test of determining whether or not data are destroyed in the ATM system. In this case, a parity bit provided by an input unit for 8-bit data is checked in an output unit in the above described ATM system so as to determine whether or not each of the 8-bit data transmitted in an 8-bit parallel format is normal and the entire transmission data are normal without any problems.

However, in the method of searching a parity bit for an error, although an error can be detected when an odd number of errors have arisen in 8-bit data, it cannot be detected when an even number of errors have arisen. An ATM cell is provided with switching information in an ATM switch based on a virtual path identifier (VPI) and a virtual channel identifier (VCI) stored in a header, and data are routed in the ATM switch based on the switching information. Accordingly, when a part of the above mentioned identifiers contain an even number of error bits, the cell cannot be routed correctly, but the errors cannot be detected by a maintenance system. Likewise, errors may not be detected even if user information data have been destroyed.

Thus, in the method of searching a parity bit for an error, it is not certain whether or not data have been normally transmitted in the ATM system. Furthermore, the method has the problem that a parity information transmission signal line is required in addition to a data transmission signal line.

Another method commonly used for testing the ATM system is operated by generating a test cell in a trunk (not shown in the attached drawings) provided, for example, in a stage prior to the multiplexer 4, and transmitting the test cell to the switch 5. This test is conducted normally to check the route in the switch 5 by transmitting a test cell from a trunk to the switch 5 at predetermined intervals at an instruction of a software interface connected to the trunk and determining whether or not the test cell has passed through a correct route in the switch 5.

However, the above described test is insufficient for an ATM system. That is, since the ATM switching unit processes data of various bands, a load test should be conducted using a test cell having a band of actual transmission data. For example, based on an assumption that data are transmitted at a rate of 1.5 Mbps and a test cell having a band of 1.5 Mbps is transmitted, a test of checking the state of a buffer in the switch 5 and a test of checking the existence of a discarded cell due to congestion of cells must be conducted.

To conduct such load tests, the number of generated test cells per unit time, that is, bands of test cells, should be variable and test cells of various bands should be generated. Conventionally, there have been no units for generating test cells of various bands. Accordingly, a terminal unit, etc. having a desired band is connected each time it is required, or an external measure, etc. must be connected for this kind of test.

SUMMARY OF THE INVENTION

An object of the present invention is to provide a test system capable of correctly confirming the integrity of data used in the ATM system.

To attain the object, the test system according to the present invention prepares a system for transmitting data stored in an ATM cell in an M-bit parallel format, and comprises a test cell generating device and a test cell confirming device.

The test cell generating device is connected to, for example, an input line of the ATM switching unit, generates a test cell having a predetermined test data pattern in an M-bit parallel format, and outputs the test cell at the timing of an idle cell. The predetermined pattern refers to, for example, data having zero in all M bits and those having 1 in all M bits.

The test cell confirming device receives the test cell from the ATM system and checks whether or not the test cell has been successfully transmitted by confirming the existence of the above described predetermined test data pattern. Using data having zero in all M bits or those having 1 in all M bits as the predetermined pattern enables a test to be conducted on each of data transmission lines, each comprising M signal lines.

Another object of the present invention is to provide a test system capable of conducting a load test using test cells of various bands in the ATM system.

To attain the object, the test cell generating device of the test system according to the present invention comprises a timing generating circuit, a test cell generating circuit, and a selector.

The timing generating circuit optionally sets two integers N and n at an instruction of a firmware, etc. The timing generating circuit comprises a counter to count an idle cell each time it is detected. The counter is an N-cycle counter, and is reset each time it counts "N". It keeps a test cell generation instruction signal in an enable state for a time period taken for counting "n" within the above described one cycle.

The test cell generating circuit outputs a test cell when the test cell generation instruction signal indicates an enable state. The test cell can be assigned a VCI as an identification of a test cell. Furthermore, serial numbers can be included as data applied to each test cell.

The selector normally selects and outputs a cell being transmitted through a line. When the test cell generating circuit outputs a test cell, the selector selects and outputs the test cell. Therefore, a test cell of a desired band determined based on the values N and n can be outputted at the timing of an idle cell.

The test system according to the present invention can be designed such that the test cell generating device outputs a test cell to the ATM switch, and the test cell detecting device receives the test cell outputted by the ATM switch and determines whether or not any cell has been discarded. It also can be designed to comprise a device for monitoring the state of a buffer of the ATM switch.

BRIEF DESCRIPTION OF THE DRAWINGS

FIG. 14 shows the operation of generating a test cell through the test cell generating unit; and FIG. 15 is a time chart indicating the operation of generating a test cell generation instruction signal through the timing generating unit based on a set value.

DESCRIPTION OF THE PREFERRED EMBODIMENTS

Figure 1:
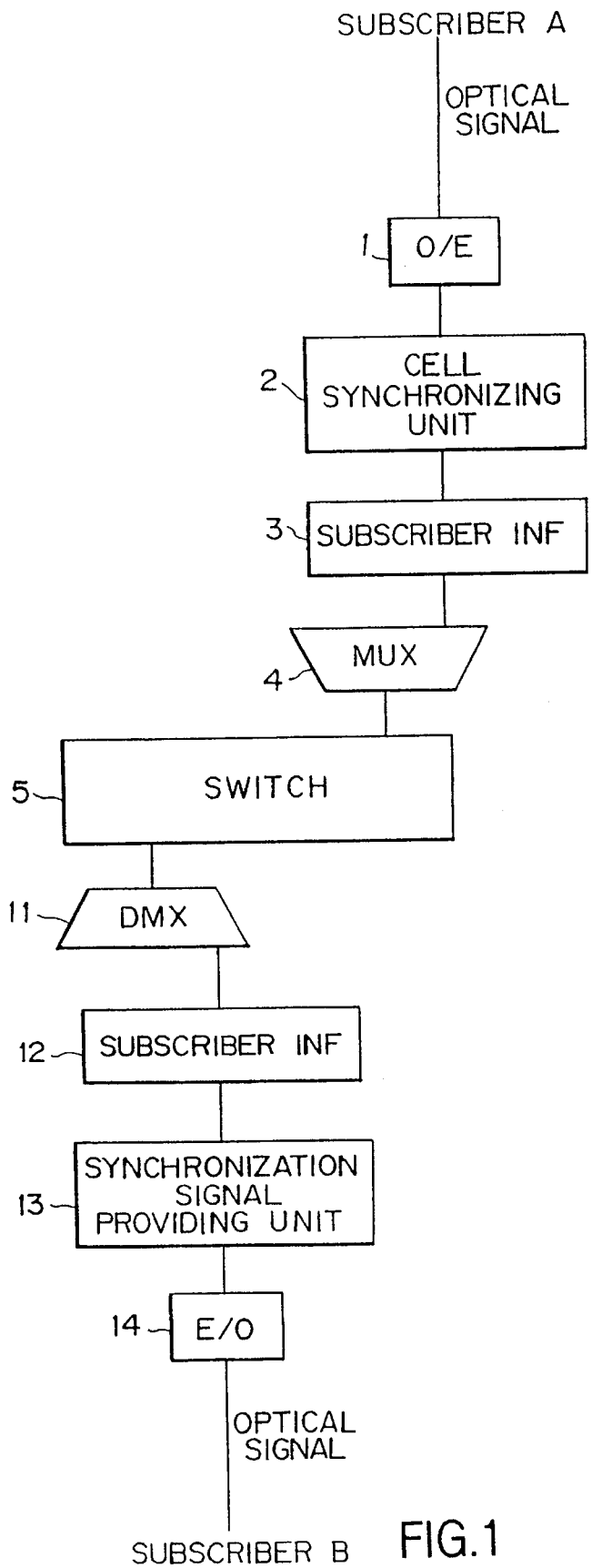
FIG. 1 shows the configuration of the outline of a common ATM system.
Figure 2:
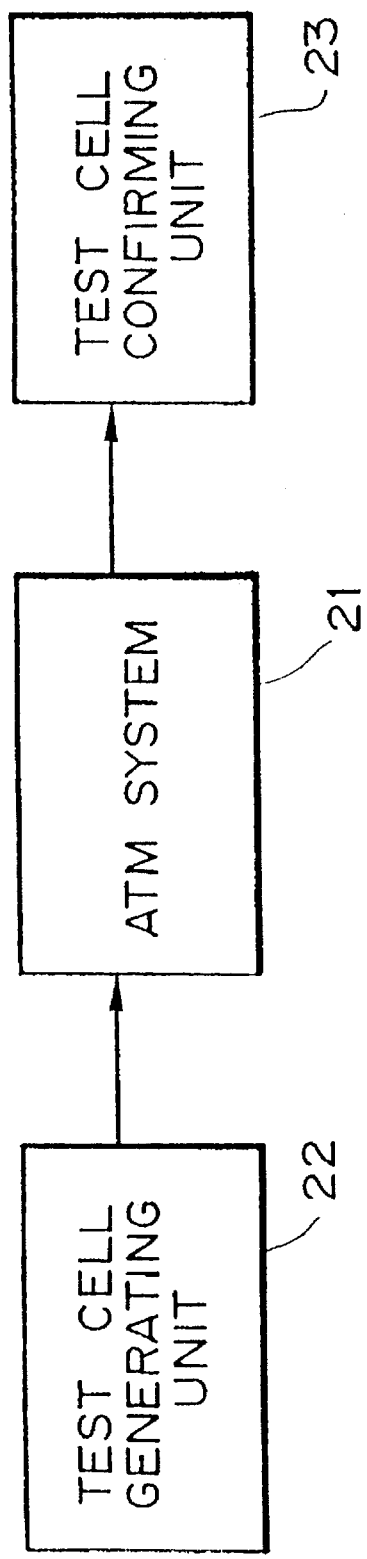
FIG. 2 is a block diagram showing the test system according to the first aspect of the present invention.

FIG. 2 is the block diagram indicating the principle of the first aspect of the present invention. Practically, it shows the test system of the ATM system for transmitting data in ATM cells in a parallel format. Described below is the first aspect of the present invention by referring to FIG. 1, that is, the outline of a common ATM system.

In FIG. 2, an ATM system 21 corresponds to the system between the cell synchronizing unit 2 and the synchronization signal providing unit 13 shown in FIG. 1, that is, the section in which the data in the ATM cells are transmitted in a parallel format. In the present case, the data are transmitted in an 8-bit parallel format.

A test cell generating device 22 can be, for example, a test cell generating circuit, and generates a test cell containing test data having 0 in all 8 bits and having 1 in all 8 bits. The test cell generating device 22 is connected to, for example, an input line of the switch 5 shown in FIG. 1. For example, the test cell generating device 22 is connected to the cell synchronizing unit 2. The test cell generating device 22 can be preceded by the cell synchronizing unit 2 to provide a test cell. For example, the subscriber interface 3 can receive the test cell. The connection between the test cell generating device 22 and the ATM system 21 is described later.

The test cell generating device 22 outputs a test cell at the timing of the transmission of idle cells. That is, the test cell generating device 22 detects the transmission timing of idle cells, and outputs a test cell at the timing instead of idle cells. Therefore, the test cell can be outputted to the ATM system 21 without affecting the transmission of significant cells.

A test cell confirming device 23 can be, for example, a test cell confirming circuit. It detects the above described test cell transmitted through the ATM system 21, and checks whether or not the test data having 0 in all 8 bits and having 1 in all 8 bits have been successfully transmitted. Thus tested is the transmission of data in the ATM system 21 in the section between the test cell generating device 22 and the test cell confirming device 23.

As described above, the test data contained in the test cell have 0 in all 8 bits and 1 in all 8 bits so that a "0" signal and a "1" signal can be normally transmitted to each of eight parallel bit lines in the ATM system 21 in the present embodiment. Using the test cell, a bit stuck, that is, a fault in a bit line, can be detected. For example, if a fault has arisen in a bit line in the 8 parallel bit lines, then an output of the bit line can be fixedly set to "1" or "0" regardless of an input signal. Therefore, if it is confirmed that both "1" and "0" have been transmitted to each bit line, then the data can be recognized as having been normally transmitted.

In the present embodiment, the test cell confirming device 23 determines whether or not the data have been normally transmitted according to three pieces of data, that is, data indicating that the test cell has been received, data indicating that data having 1 in all 8 bits are stored at a predetermined position in the test cell and have been normally transmitted, and data indicating that data having 0 in all 8 bits are stored at a predetermined position in the test cell and have been normally transmitted. It is confirmed that data in cells have been normally transmitted via each of the eight parallel bit lines, that is, all data have been successfully transmitted, by detecting the above described three pieces of data.

Figure 3:
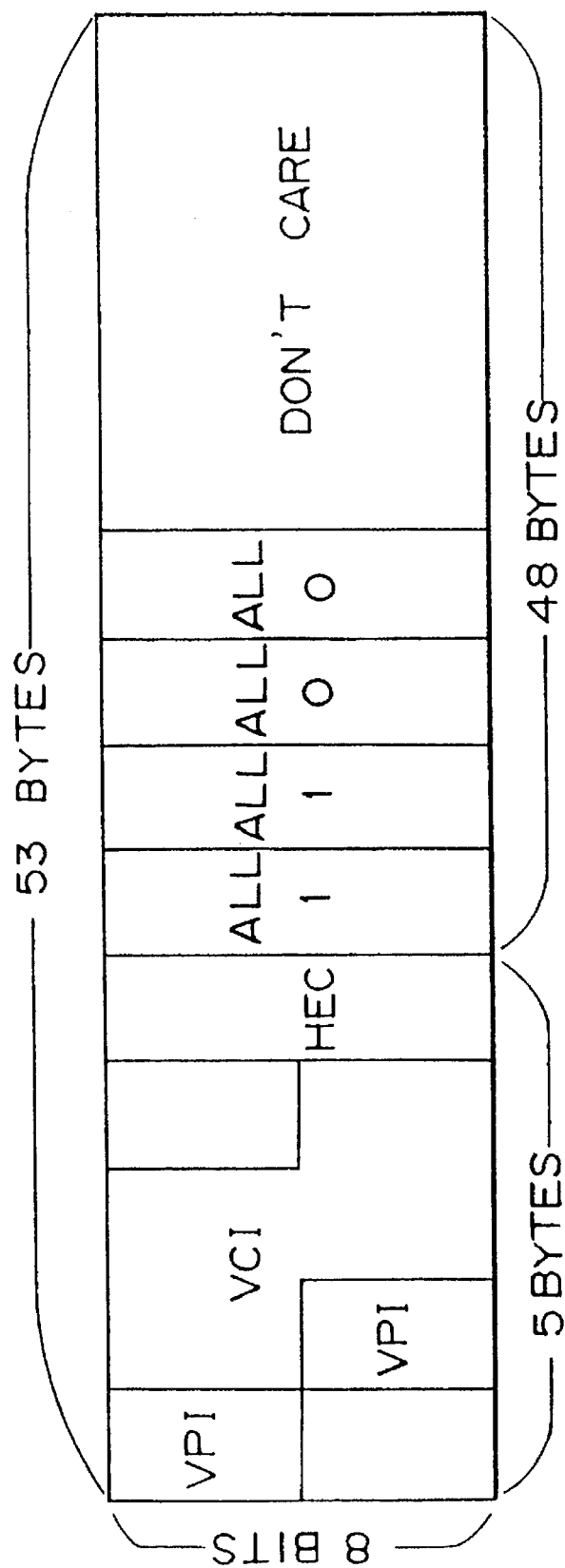
FIG. 3 shows an example of the configuration of the test cell according to the embodiment of the first aspect.

FIG. 3 shows an embodiment of a test cell format. In FIG. 3, a test cell is assigned a specific value as a virtual channel identifier (VCI) indicating a test cell. The VCI is put into the four bits in the second byte of the 5-byte header of the ATM cell, into all bits of the third byte, and into four bits of the fourth byte. The VCI of the test cell in the present embodiment repeats "1000" for each fourth bit.

The heading 2 bytes of 48-byte information preceded by the above described header are provided with test data having 1 in all 8 bits, and the second 2 bytes are provided with test data having 0 in all 8 bits. The remaining 44-byte data in the information part are all "don't care" data.

Figure 4:
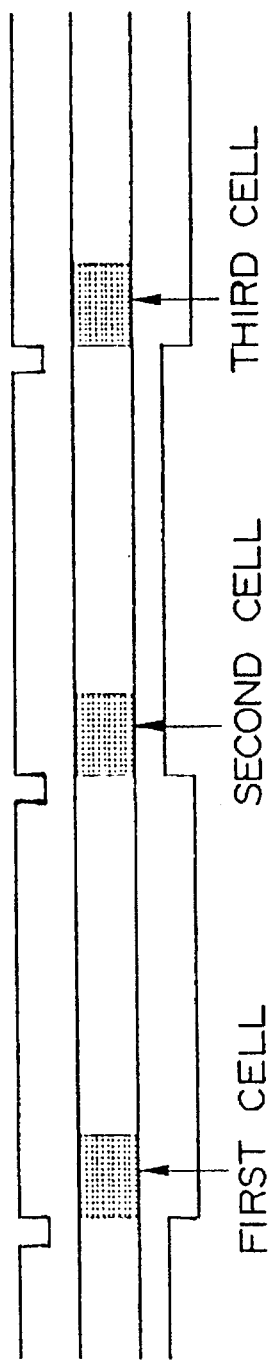
FIG. 4 is the time chart indicating operation of the control signals and transmission of cells in the ATM system.

FIG. 4 shows the transmission timing of cells and an enable signal ENB in the ATM system. In FIG. 4, a cell frame signal CF refers to a pulse indicating the head of the cell detected by the cell synchronizing unit 2 shown in FIG. 1. The pulse is followed by ATM cell data in the transmission sequence. The enable signal ENB indicates "L" during the transmission of significant cells, and indicates "H" while significant cells are not transmitted, that is, during the transmission of idle cells.

The enable signal ENB indicates "H" when, for example, the cell synchronizing unit 2 detects in the header of an input cell a specific header pattern indicating an idle cell. FIG. 4 shows an example of the enable signal ENB when the first and third cells are significant cells and the second cell is an idle cell. The above described cell frame signal CF and enable signal ENB are transmitted to the ATM system and the test cell generating circuit through signal lines separated from 8 parallel data lines.

Figure 5:
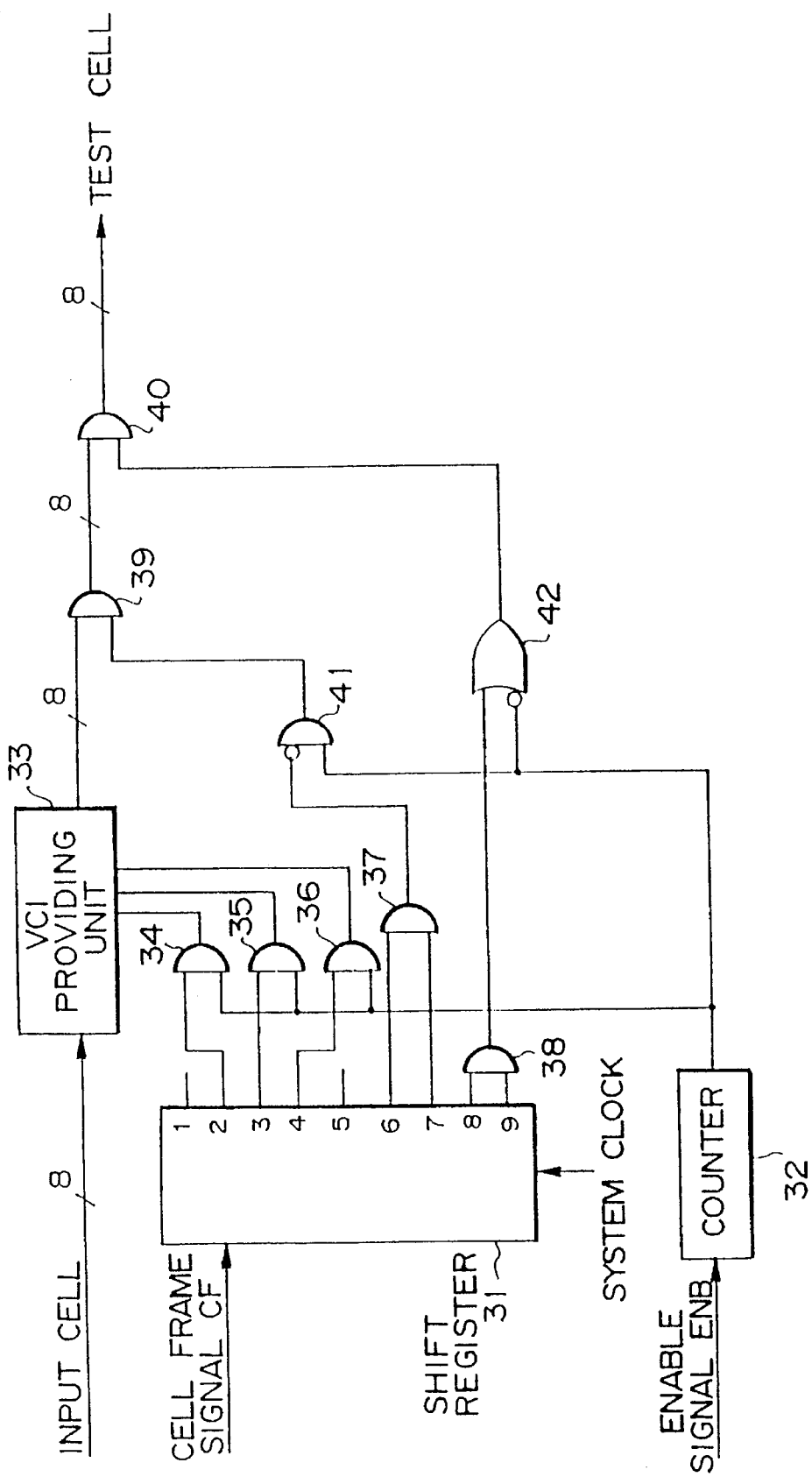
FIG. 5 shows an example of the configuration of the test cell generating circuit.

FIG. 5 is the block diagram showing the configuration of the test cell generating circuit. In FIG. 5, the test cell generating circuit receives the cell frame signal CL and enable signal ENB together with the input cell data transmitted in an 8-bit parallel format. The test cell generating circuit comprises a shift register 31 for receiving the cell frame signal CF, a counter 32 for receiving and counting the enable signal ENB, a VCI providing unit 33 for providing a header of a cell with a virtual channel identifier for identifying a test cell when the test cell is outputted, AND circuits 34 through 41, and an OR circuit 42.

The shift register 31 sequentially outputs to output terminals 1 through 9 a pulse signal of a cell frame signal CF according to a system clock by shifting the signal each time 1 byte of the cell described by referring to FIG. 3 is entered. That is, at the timing of the first byte of the cell data preceded by the above described pulse signal, the output of the shift register 31 indicates "0", and the outputs of other output terminals indicate "1". At the timing of the second byte of the above described cell, the output of output terminal 2 of the shift register 31 indicates "0", and the outputs of other output terminals indicate "1". Likewise, the outputs of output terminals 3, 4, 5, . . . sequentially indicate 0 at each input of one byte.

The counter 32 keeps count when the enable signal ENB indicates "H", that is, each time an idle cell is entered. It outputs "H" when the count value has reached a predetermined value, that is, when a predetermined number of cells have been detected. The counter 32 outputs "H" during the period required by a cell to pass through the test cell generating circuit. The test cell generating circuit outputs a test cell during the period in which the counter 32 outputs "H". Thus, the test cell generating circuit outputs test cells at the optional timing of a idle cell.

In the present embodiment, the VCI providing unit 33 provides a specific value "1000" indicating a test cell as a VCI assigned to the header of a test cell. The VCI 1000 is provided according to a signal AND circuits 34 through 36. That is, after the cell frame signal CF is entered, AND circuit 34 outputs "L" at the second clock timing (at the second byte of the test cell shown in FIG. 3). Then, at the fall point of output signal from AND circuit 34, the VCI providing unit 33 assigns to 4 bits of the second byte of the test cell the VCI pattern 1000 for the test cell pre-set in the VCI providing unit 33. Likewise, since AND circuits 35 and 36 output "L" at the 3rd and 4th bytes of the test cell, the VCI "1000" is provided for the 3rd and 4th bytes of the test cell.

When a test cell is not generated, then an output of the counter 32 indicates "L", and outputs of AND circuits 34 through 36 are constantly "L". Therefore, the fall point indicating an assignment of the above described value "1000" is not entered in the VCI providing unit 33, and the VCI providing unit 33 does not provide the value "1000" for a significant cell. Thus, the VCI providing unit 33 provides only a test cell with the value "1000".

Explained below is the operation of entering test data in the information portion of a test cell. An output of the shift register 31 is shifted as described above. At the timing of the 6th byte of the test cell in FIG. 3, an output of output terminal 6 of the shift register 31 indicates "0". As a result, the output of AND circuit 37 indicates "0", and the outputs of AND circuits 39 and 40 indicate "1". (Each of AND circuits 39 and 40 comprise 8 AND gates.) Therefore, at the timing of the 6th byte, the test cell generating circuit outputs data indicating "1" in all 8 bits. At the timing of the 7th byte of the succeeding test cell, an output of output terminal 7 of the shift register 31 indicates "0", and the test cell generating circuit outputs data indicating "1" in all 8 bits. Thus, test data of "1" in all 8 bits are provided for the 6th and 7th bytes (two heading bytes of the information portion of a test cell).

Furthermore, at the timing of the 8th and 9th bytes, outputs of output terminals 8 and 9 of the shift register 31 indicate "0", and an output of AND circuit 40 indicates "0". Therefore, data of the 8th and 9th bytes of a test cell output data of "0" in all 8 bits. Thus, the 8th and 9th bites of the test cell are provided with test data having "0" in all 8 bits. Since data after the 10th byte inclusive of a test cell are "don't care" data, the test cell generating unit outputs data pattern of an idle cell.

The test cell generating circuit shown in FIG. 5 is provided in the synchronizing unit 2 shown in FIG. 1. In this case, the test cell confirming circuit is provided in an optional device between the subscriber interface 3 and the synchronization signal providing unit 13 in the ATM system. Then, the test cell confirming circuit monitors the VCI of an input cell, recognizes a test cell by detecting the VCI "1000" provided by the above described VCI providing unit 33, and checks the test data stored in the 6th through 9th bytes of the test cell.

Figure 6:
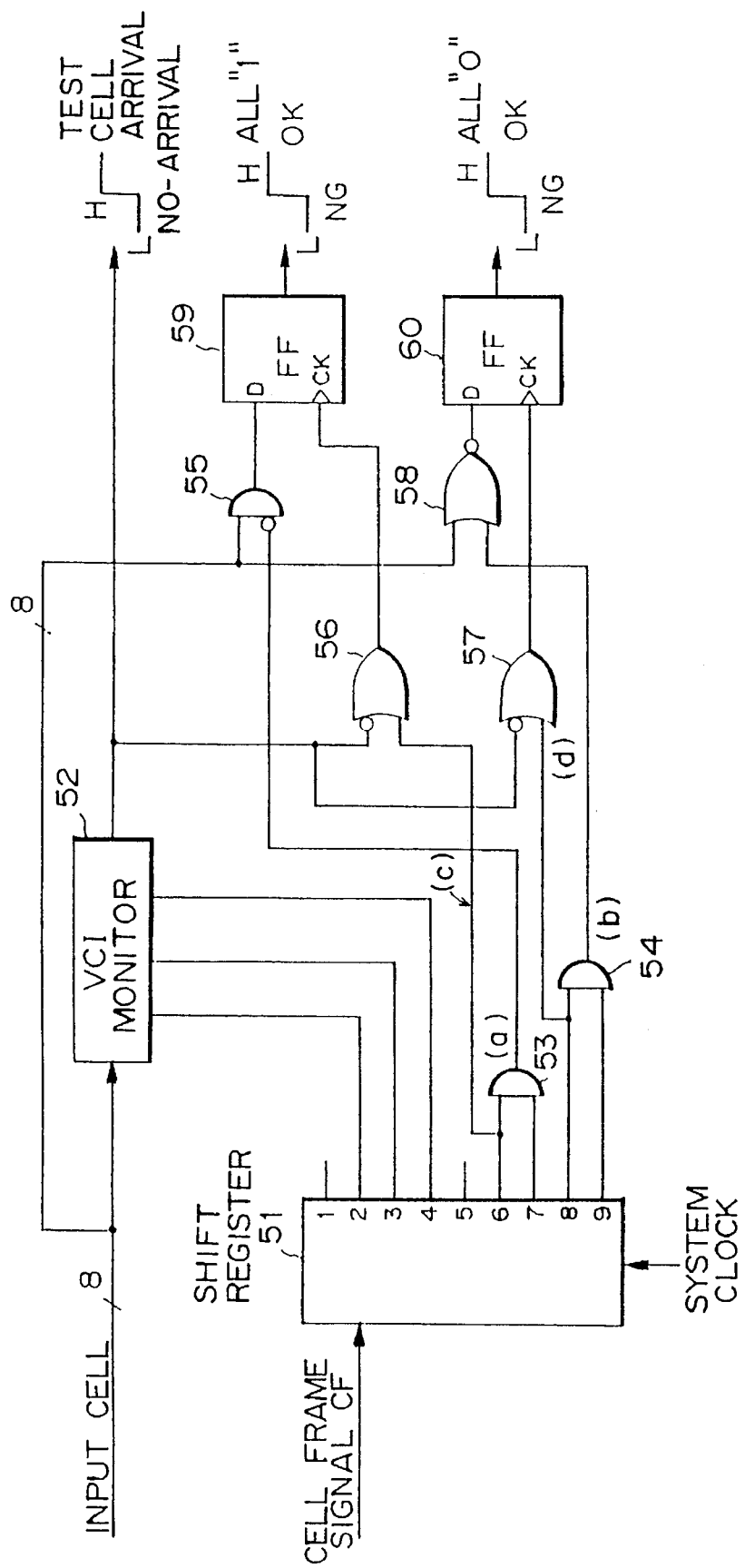
FIG. 6 shows an example of the configuration of the test cell confirming circuit.

Explained below is the test cell confirming circuit for checking test data. FIG. 6 is the block diagram showing the configuration of the test cell confirming circuit. In FIG. 6, the test cell confirming circuit comprises a shift register 51 for receiving a cell frame signal CF, a VCI monitor 52 for determining whether or not a VCI assigned to an input cell is one indicating a test cell, AND circuits 53 through 55, OR circuits 56 and 57, NOR circuit 58, and flipflops 59 and 60.

In FIG. 6, the shift register 51 performs the same operation as the shift register 31 shown in FIG. 5. That is, the shift register 51 shifts the pulse signal of the cell frame signal CF for each byte of an input cell according to a system clock. Therefore, at the timing of the second byte after the above described pulse signal is entered, the output signal of output terminal 2 of the shift register 51 indicates "L". Then, the VCI monitor 52 compares the value of the VCI stored in the second byte of the header of an input cell with the value "1000" preset in the VCI monitor 52 at the timing of each fall point of an output signal of output terminal 2 of the above described shift register 51. Likewise, at the timing of the 3rd and 4th bytes after the above described pulse signal is entered, outputs of the output terminals 3 and 4 of the shift register 51 indicate "L", and the VCI monitor 52 compares the values of the VCIs stored in the 3rd and 4th bytes of the header of an input cell with the value "1000" preset in the VCI monitor 52.

If the above described comparisons all indicate coincidences, that is, when "1000" is detected as a VCI of an input cell, then the test cell confirming circuit recognizes that the input cell is a test cell, and confirms the test data stored in the 6th through 9th bytes of a test cell. Thus, the test cell confirming circuit detects test cells from all input cells and confirms test data. Then, the VCI monitor 52 outputs "H" to indicate that a test cell has been received when the test cell has been detected.

Explained below is the operation of determining whether or not test data in a test cell have been normally transmitted when the test cell confirming circuit has detected the test cell. It is explained by referring to the test result output signal shown in FIG. 7.

When the test cell confirming circuit has detected a test cell, "H" is applied (inversely inputted) to one input terminal of OR circuit 56 from the VCI monitor 52. At the timing of the 6th and 7th bytes of the input cell, output (a) of AND circuit 53 indicates "L". To another input terminal of OR circuit 56, a signal indicating "L" is applied at the timing of the 6th byte of the input cell as shown by (c) in FIG. 7. Accordingly, flipflop 59 stores an output signal of AND circuit 55 at the timing of the rise point at the boundary between the 6th and 7th bytes of the input cell.

AND circuit 55 comprises eight AND gates. If outputs of all the eight AND gates indicate "H", then an output of AND circuit 55 indicates "H". Therefore, if the 6th and 7th bytes of an input test cell contains all "1", then flipflop 59 stores "H". On the other hand, if either the 6th or 7th byte contains "0", then an output of AND circuit 55 indicates "L", and the corresponding flipflop 59 stores "L".

Since the test cell generating circuit outputs as "1" all bits of the 6th and 7th bytes of a test cell, an output of flipflop 59 indicates "H" only when all of the eight bit lines for transmitting cell data normally transmit "1" in the ATM system between the test cell generating circuit and the test cell confirming circuit. On the other hand, if at least one bit line of the above described eight bit lines could not normally transmit "1", an output of flipflop 59 indicates "L". Thus, it can be determined whether or not the ATM system has normally transmitted test data having the values of "1".

Figure 7:
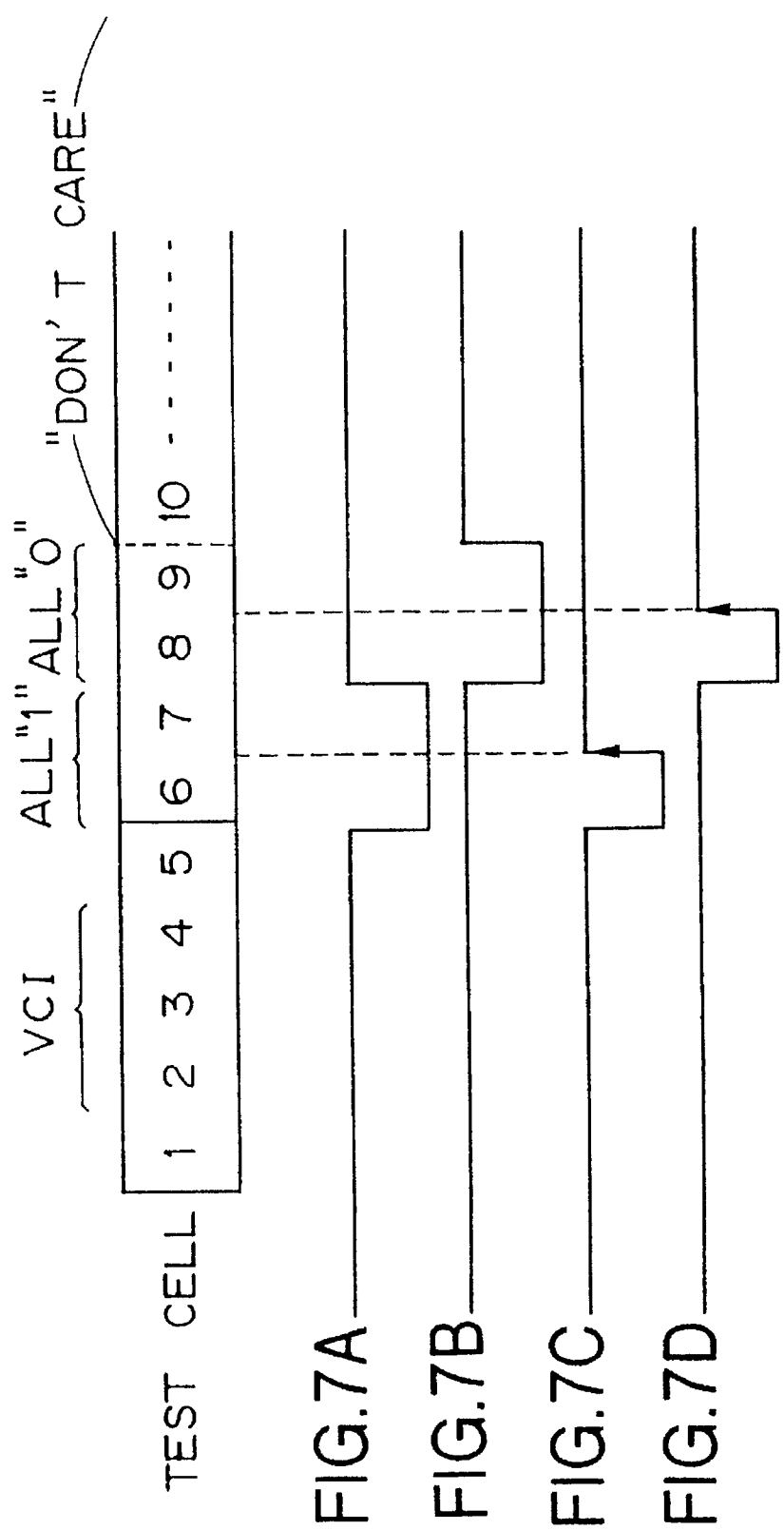
FIG. 7 is a time chart indicating the operation of confirming the integrity of data through the test cell confirming circuit.

At the timing of the 8th and 9th bytes of an input cell, output (b) of AND circuit 54 indicates "L" as shown in FIG. 7. An output signal of output terminal 8 of the shift register 51 indicates "L" at the timing of the 8th byte of an input cell as shown by (d) in FIG. 7. Therefore, flipflop 60 stores an output signal of NOR circuit 58 at the rise point at the boundary between the 8th and 9th bytes of the input cell.

NOR circuit 58 comprises eight NOR gates. If all outputs of the eight NOR gates indicate "L", then an output of NOR circuit 58 indicates "H". Accordingly, if all values of the 8th and 9th bytes of an input test cell indicate "0", then flipflop 60 stores "H". On the other hand, if at least one of the values in the 8th and 9th bytes of an input cell indicates "1", then flipflop 60 stores "L".

Thus, the test cell confirming circuit can confirm whether or not all the eight bit lines for transmitting cell data have normally transmitted "0" in the ATM system between the test cell generating circuit and the test cell confirming circuit.

As described above, the test cell confirming circuit according to the present embodiment confirms the following three points, namely, that a test cell outputted by the test cell generating circuit is transmitted by the ATM system and detected by the test cell confirming circuit; that "1" can be normally transmitted among the test data stored in the test cell; and that "0" can be normally transmitted among the test data stored in the test cell.

In the present embodiment, these three pieces of information can be obtained as output signals of the VCI monitor 52, and flipflops 59 and 60. If all the three outputs are normal, that is, they indicate all "H", then it can be determined that the ATM system between the test cell generating circuit and the test cell confirming circuit normally transmits cells.

The above described output information can be maintained corresponding to each test cell as a result of the determination of a test, can be notified as status data for software, and can be displayed using the LED. For example, even if a test cell has reached as a result of the output by the VCI monitor 52, 0 stuck (data are fixed to "0") of a bit line is detected when an output of flipflop 59 does not indicate "H", and 1 stuck (data are fixed to "1") of a bit line is detected when an output of flipflop 60 does not indicate "H".

The ATM system can comprise a plurality of test cell confirming circuits. In this case, each of the plurality of test cell confirming circuits detects a test cell outputted by the test cell generating circuit. Therefore, it is tested whether or not data have been normally transmitted in the section of the ATM system between the test cell generating circuit and each test cell confirming circuit. With the configuration, a transmission error can be located when it has arisen in the ATM system.

As described above in detail, according to the first aspect of the present invention, it is confirmed whether or not data have been normally transmitted in the ATM system. Especially when cell data are transmitted in an M-bit parallel format in the ATM system, a plurality of destroyed data can be detected in data transmitted in the M-bit parallel format. Furthermore, data can be checked without transmitting a parity bit, thus reducing the number of signal lines. Additionally, a bit line stuck can also be detected, thereby greatly improving the reliability of the ATM system.

Explained below is the test system according to the second aspect of the present invention.

Figure 8:
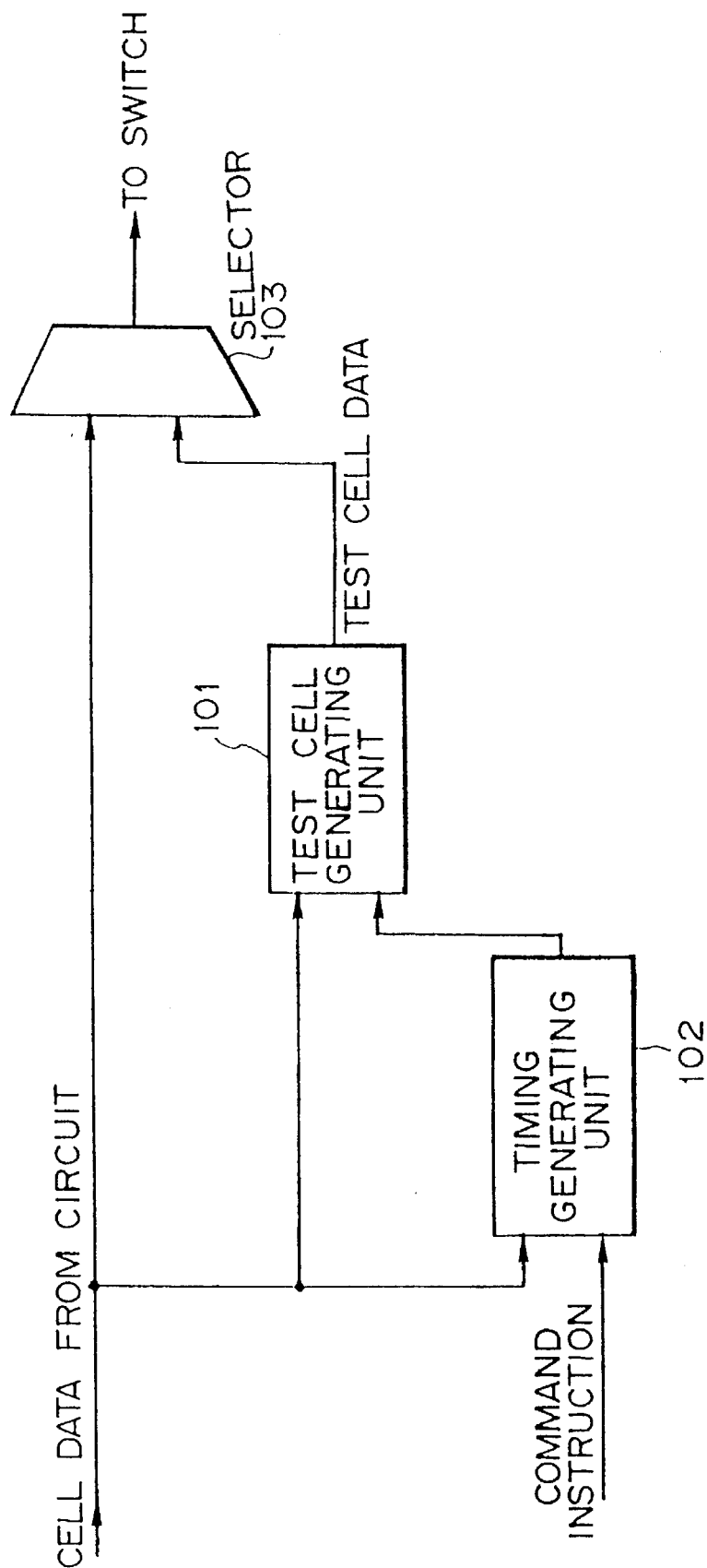
FIG. 8 is a block diagram of the test cell generating device of the test system according to the second aspect of the present invention.

FIG. 8 shows the principle of the test cell generating device of the test system according to the second aspect of the present invention. The test cell generating device comprises a test cell generating unit 101 for generating a test cell, a timing generating unit 102 for generating a timing signal according to which a test cell is generated, and a selector 103 for selecting and outputting either of a cell inputted through a circuit or a test cell.

The timing generating unit 102 generates n test cells (n is an integer) for N cells (N is an integer, and N≧n) according to a command issued by the firmware interface, etc. That is, the timing generating unit 102 repeatedly counts 0 through N input cells, and outputs a test cell generation instruction signal to generate n test cells during each of the counting periods.

The test cell generating unit 101 generates test cell data according to the test cell generation instruction signal outputted by the timing generating unit 102 and transmits the test cell data to the selector 103. The selector 103 selects a significant cell when the significant cell is applied from a circuit, transmits it to the switch of the ATM system, puts the test cell data in a test cell and transmits them to the above described switch when it receives them.

Since the number of the test cells outputted in a time unit can be counted by optionally setting N and n, test cells of various bands can be generated. Therefore, a load test can be easily conducted by providing test cells of various bands for the switch of the ATM system to check the discard of cells due to the congestion of cells in the switch or the state of the buffer of the switch. Furthermore, a path test can be conducted for the switch unit through the test system.

Figure 9:
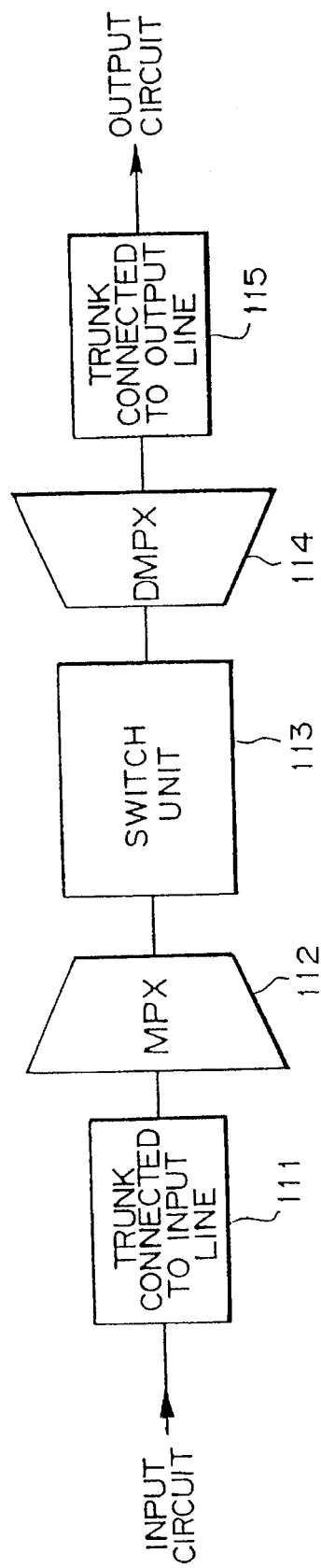
FIG. 9 shows the configuration in the vicinity of the switch in the ATM system.

FIG. 9 is the block diagram showing the outline of the vicinity of the switch of the ATM system. As shown in FIG. 9, a cell transmitted from a subscriber is received by a trunk 111 connected to an input line, and applied to a switch 113 through a multiplexer 112. In the switch 113, the cell is routed according to the control information such as a VPI/VCI, etc. stored in the header of the cell. Then, an output of the switch 113 is transmitted to a destination unit through a demultiplexer 114 and a trunk 115 connected to an output line.

The multiplexer 112, the switch 113, and the demultiplexer 114 shown in FIG. 9 correspond to the multiplexer 4, the switch 5, and the demultiplexer 11 shown in FIG. 1 respectively. The trunk 111 connected to an input line and the trunk 115 connected to an output line are provided in the succeeding steps of the subscriber interface 3 and the demultiplexer 11 shown in FIG. 1 respectively. The test cell generating device shown in FIG. 8 is provided in the trunk 111 connected to an input line.

Figure 10:
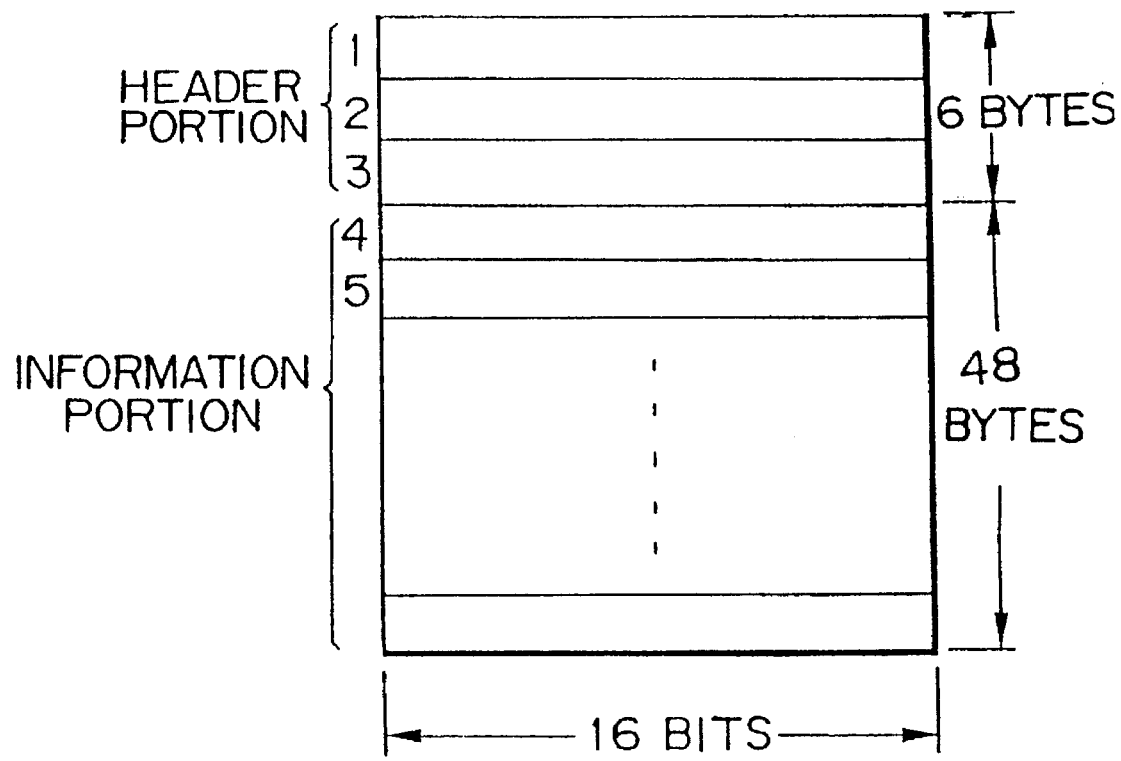
FIG. 10 shows the configuration of the cell according to the embodiment of the second aspect.

In the embodiment according to the first aspect of the present invention, cell data are transmitted in an 8-bit parallel format in the ATM system. However, in the present embodiment, data are transmitted in a 16-bit parallel format as shown in FIG. 10. Thus, when ATM cell data are transmitted in a 16-bit parallel format, the six heading bytes of cells form a header portion storing control information such as a VPI/VCI, etc. followed by a 48-byte information portion.

Figure 11:
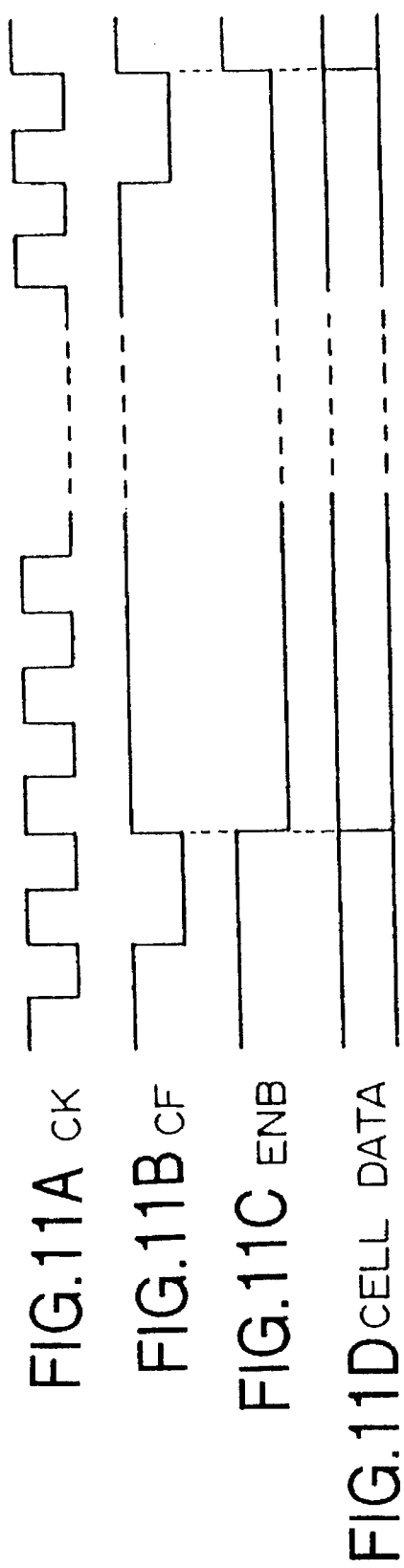
FIG. 11 is a time chart indicating the operation of the transmission of cells and control signals in the ATM system.

Cell data and a control signal are transmitted through the path between the trunk 111 connected to an input line and the trunk 115 connected to an output line at the timing shown in FIG. 11. In FIG. 11, the cell frame signal FC and the cell enable signal ENB are similar to those in the embodiment according to the first aspect. For example, they are generated by the synchronizing unit 2 shown in FIG. 1. That is, the cell frame signal CF is a pulse signal indicating the head of the cell, and the cell enable signal ENB is a signal indicating "L" in the period during which a significant cell is transmitted, and indicating "H" in the period during which an idle cell is transmitted. The clock signal CK corresponds to the system clock in the embodiment according to the first aspect, and a 16-bit signal is processed per clock signal CK.

Explained below is the test cell generating device according to the present embodiment.

Figure 12:
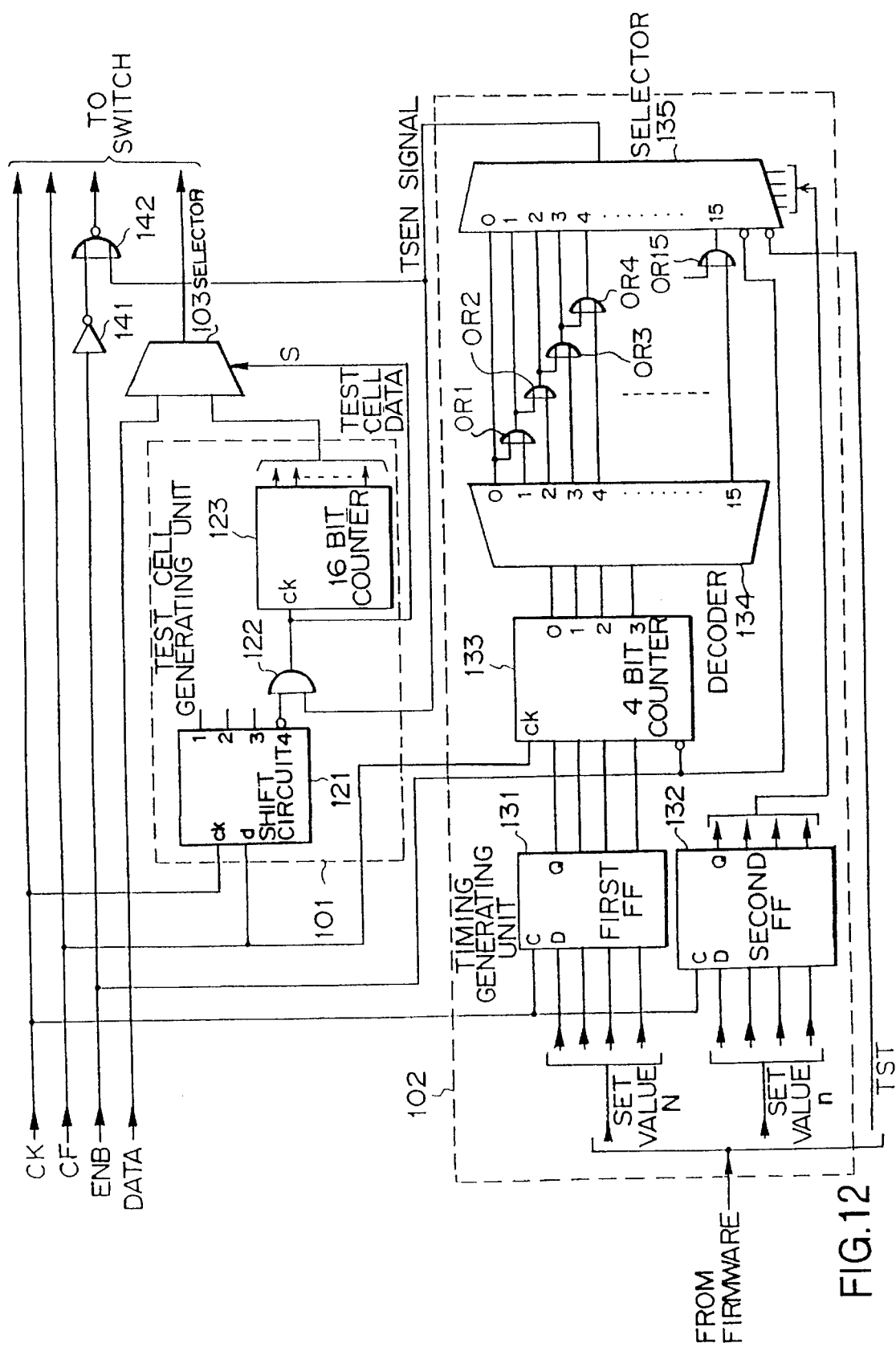
FIG. 12 shows the circuit configuration of an example of the test cell generating device.

FIG. 12 indicates the configuration of the circuit of the test cell generating device for generating a test cell of an optional band, and is provided in the trunk 111 connected to an input line.

In FIG. 12, the identification numbers 101 through 103 refer to the same units shown in FIG. 8. Furthermore, CK, CF, ENB, and DATA refer to the clock signal, cell frame signal, cell enable signal, and cell data respectively.

The test cell generating unit 101 comprises a shift circuit 121, AND circuit 122, and 16-bit counter 123. The clock signal CK is applied to the clock terminal ck of the shift circuit 121, and the cell frame signal CF is applied to the data terminal d.

An output signal of output terminal 4 of the shift circuit 121 is transmitted to an input terminal of the AND circuit 122. A test cell generation instruction signal TSNB (described later in detail) is applied to another input terminal of the AND circuit 122 from the timing generating unit 102. An output signal of the AND circuit 122 is applied to the clock terminal ck of the 16-bit counter 123 and the selector 103. A count value output signal of the 16-bit counter 123 is applied to the selector 103. The selector 103 selects and outputs either of the count value output signal or the cell data DATA according to the output signal (select signal S) of the AND circuit 122.

The timing generating unit 102 comprises a first flipflop circuit 131, a second flipflop circuit 132, a 4-bit counter 133, a decoder 134, a selector 135, and OR circuit group OR1 through OR15 provided between the decoder 134 and the selector 135.

Each of the first flipflop circuit 131 and the second flipflop circuit 132 comprises a plurality of flipflops and respectively sets values N and n used in determining the band of a test cell. For example, if the first flipflop circuit 131 sets the value N of 5 and the second flipflop circuit 132 sets the value N of 2, then two test cells are generated in the time during which five cells are passed.

Figure 13:
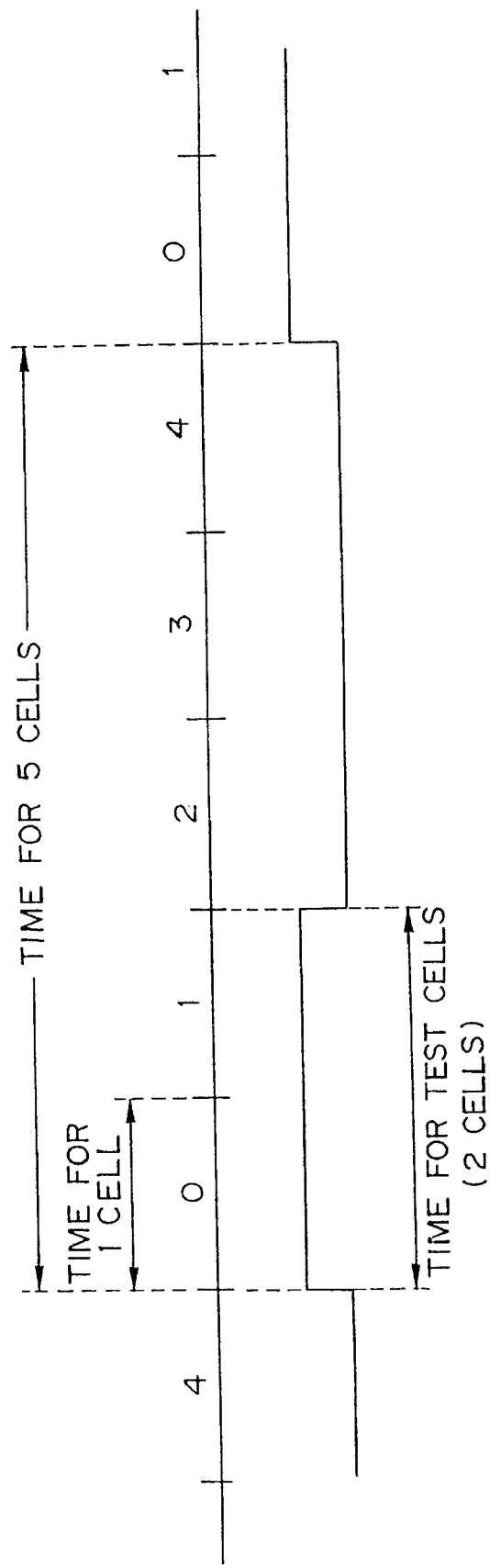
FIG. 13 shows the timing at which a test cell of a band assigned based on a set value is generated.

This is shown in FIG. 13. In the ATM system, since significant and idle cells are transmitted at predetermined intervals, test cells covering two fifths of bands are generated in the ATM system if two test cells are generated in the time during which five cells are transmitted.

The above settings of the first flipflop circuit 131 and the second flipflop circuit 132 are performed by receiving an instruction of firmware (not shown in the drawings) through a firmware interface. The settings can be realized by a user's or a system administrator's entering values through keys.

The 4-bit counter 133 counts the cell frame signal CF, and repeatedly counts a value set in the first flipflop circuit 131. For example, if a set value N is 5, then the 4-bit counter 133 is cleared every fifth count. Therefore, in this case, the number of cell frame signals CF can be repeatedly counted from 0 to 4. The cell enable signal ENB is applied to the inhibit terminal of the 4-bit counter 133. Since the cell enable signal ENB indicates "L" while a significant cell is transmitted, and "H" while an idle cell is transmitted, the 4-bit counter 133 can keep count only when idle cells are transmitted. Therefore, the 4-bit counter 133 keeps count each time an idle cell is entered.

An output of the 4-bit counter 133 is provided for the decoder 134. Since the set value N is 5, the values 0 through 4 are sequentially assigned. Then, the decoder 134 decodes the value, and outputs it to the selector 135 and OR circuit group OR1 through OR15. A signal outputted by output terminal 0 of the decoder 134 is applied to input terminal 0 of the selector 135 and one input terminal of OR circuit OR1. A signal outputted by output terminal 1 of the decoder 134 is applied to another input terminal of OR circuit OR1. Likewise, an output of OR circuit of a preceding stage and signals outputted by output terminals 3, . . . , 15 of the decoder 134 are applied to OR circuit OR2, OR3, . . . , OR15. The output of each of these OR circuit group OR1, OR2, . . . , OR15 is applied to one of corresponding input terminals 1 through 15.

A value n set as a selection signal by the second flipflop circuit 132 is applied to the selector 135. For example, if a value n set by the second flipflop circuit 132 is 2, then the selector 135 selects and outputs the second input signal to the selector 135, that is, data applied to input terminal 1 of the selector 135. If the set value n is 3, then the selector 135 selects and outputs the third input signal, that is, data applied to input terminal 2. Thus, a signal outputted by the selector 135 is applied as a test cell generation instruction signal TSEN to the AND circuit 122 and one terminal of a NOR circuit 142. A signal inverted from the above described cell enable signal ENB by an inverter 141 is applied to another terminal of the NOR circuit 142.

As in the 4-bit counter 133, the cell enable signal ENB is applied to the inhibit terminal of the selector 135. Therefore, the selector 135 can output "H" of a test cell generation instruction signal TSEN only at the timing of entering an idle cell, and outputs "L" at the timing of entering a significant cell. With such a configuration, a test cell is generated only at the timing of transmitting an idle cell. Accordingly, there are no influences on the transmission of significant cells. Furthermore, a test instruction signal TST indicating the start and end of generating a test cell is applied to the selector 135. The test instruction signal TST indicates "H" in the time during which a test cell is generated, and otherwise "L". When the test instruction signal TST indicates "L", the selector 135 performs no selecting operation at all.

Explained below is the operation of the test cell generating circuit with the above described configuration. During the normal operation, that is, when no test cells are generated, the clock signal CK, cell frame signal CF, and cell enable signal ENB are transmitted to a switch as is. Input cell data DATA are applied to the selector 103, and the selector 103 selects and outputs the input cell data DATA.

When a test cell is generated to conduct a load test, etc. on the switch of the ATM system, the test cell generating unit 101 and the timing generating unit 102 operate as follows. In the following processes, idle cells are applied as input cells, and the generation of a test system is instructed (enabled) according to the cell generation instruction signal TSEN outputted by the timing generating unit 102.

The above described TSEN signal is determined by values N and n set in the first flipflop circuit 131 and the second flipflop circuit 132 of the timing generating unit 102. "H" is applied to the AND circuit 122 at the timing of generating a test.

When the shift circuit 121 receives a pulse signal of the cell frame signal CF indicating the head of an idle cell, the pulse signal is shifted according to the clock signal CK in the test cell generating unit 101. That is, output terminal 1 of the shift circuit 121 indicates "L" at the first clock after an input cell has been received. Then, the outputs of output terminals 2, 3, and 4 sequentially indicate "L" according to the clock signal CK. Then, an inverted output signal of output terminal 4 is applied to the AND circuit 122.

Therefore, when a test cell has been generated, an output signal of the AND circuit 122, that is, a selection signal S, indicates "H" at the 4th clock after the cell frame signal CF indicating the head of an idle cell has been entered. Then, the selection signal S is applied to the clock terminal ck of the 16-bit counter 123 and the selection terminal of the selector 103.

FIG. 14 is the time chart showing the operation when the test cell generating unit 101 generates a test cell. When a test cell is generated, the TSEN signal indicates "H" if the cell frame signal CF has been received. Since an inverted output signal of output terminal 4 indicates "H" at the fourth clock after the pulse of the cell frame signal CF, the selection signal S indicates "H" at the timing of fourth clock after the pulse of the cell frame signal CF.

The 16-bit counter 123 increments the counter value each time the pulse of a selection signal S is received, and transmits the counter value to the selector 103. On receiving a selection signal S, the selector 103 selects and outputs at the pulse of the signals a count value signal applied by the 16-bit counter 123. Accordingly, as shown in FIG. 14, a count value is entered as test data at the fourth clock after the pulse of the cell frame signal CF, that is, at the head position of the information portion of a test cell. As a result, a test cell outputted by the test cell generating device contains test data having serial values from the 16-bit counter 123 in the order they are outputted.

A TSEN signal is also applied to the NOR circuit 142. As described above, since the TSEN signal indicates "H" when a test cell has been generated, an output signal of the NOR circuit 142 indicates "L". An output signal of the NOR circuit 142 is an enable signal ENB outputted by the test cell generating circuit. Therefore, at the generation of a test cell, the enable signal ENB outputted by the test cell generating circuit indicates "L", and a device which receives the test cell does not recognize the test cell as an idle cell.

The test cell generating unit 101 provides an identifier indicating a test cell, for example, a specific VCI, for the header portion of a test cell. The configuration for providing the VCI may be the same as that according to the first aspect of the present invention. Therefore, the test cell receiving device detects a test cell by monitoring the specific VCI.

Explained below by referring to the time chart shown in FIG. 15 is the operation of generating a test cell by the timing generating unit 102.

As described above, predetermined values N and n are set in the first flipflop circuit 131 and the second flipflop circuit 132 according to an instruction of the firmware. In the present example, the values N and n are set to 5 and 2 respectively.

The 4-bit counter 133 repeatedly counts 0 through 4 (b) of the pulses of the cell frame signal CF (a) according to the value N set in the first flipflop circuit 131. An output signal of the 4-bit counter 133 is decoded by the decoder 134. An output of the decoder 134 repeats the operation in which the outputs of output terminals 0 through 4 sequentially indicate "H" ((c)–(g)).

An output signal of output terminal 0 of the decoder 134 (c) is an input signal to input terminal 0 of the selector 135 (h). An input signal to input terminal 1 of the selector 135 (i) is an output signal of a logical sum obtained by OR1 with an output signal of output terminal 0 of the decoder 134 (c) and an output signal of output terminal 1 of the decoder 134 (d). An input signal to input terminal 2 of the selector 135 (j) is an output signal of a logical sum obtained by OR2 with an output signal of OR1 (i) and an output signal of output terminal 2 of the decoder 134 (e). Simultaneously, an input signal to input terminal 3 of the selector 135 (k) is an output signal of a logical sum obtained by OR3 with an output signal of OR2 (j) and an output signal of output terminal 3 of the decoder 134 (f). An input signal to input terminal 4 of the selector 135 (l) is an output signal of a logical sum obtained by OR4 with an output signal of OR3 (k) and an output signal of output terminal 4 of the decoder 134 (f).

As shown in FIG. 15, an input signal (h) to input terminal 0 of the selector 135 indicates "H" for one fifth of the time required for five cells to pass through the ATM system, that is, for the time required for a cell to pass through the system. Thus, input signals to input terminals 1, 2, and 3 of the selector 135 indicate "H" for the time required for two, three, and four cells respectively to pass through the system. An input signal to input terminal 4 of the selector 135 constantly indicates "H".

The selector 135 is provided with a value n as a selection signal set in the second flipflop circuit 132. In the present example, the value n is set to 2, and the second input signal of the selector 135, that is, an input signal of input terminal 1 of the selector 135, is selected and outputted as a TSEN signal (m).

If the TSEN signal indicates "H", then the test cell generation instruction signal indicates an enable state. That is, the test cell generating unit 101 outputs a test cell while a TSEN signal indicates "H". Therefore, in the example shown in FIG. 15, a TSEN signal indicates "H" during the time required for two cells to pass through the system, and the test cell generating unit 101 generates and outputs two test cells. Thus, if a value of 5 is set in the first flipflop circuit 131 and a value of 2 is set in the second flipflop circuit 132, then two test cells are generated and outputted during the time required for five cells to pass through the system. That is, test cells covering two fifths of the band of the ATM system are outputted.

If the band of a test cell is to be changed, only values N and n set in the first flipflop circuit 131 and the second flipflop circuit 132 have to be changed. For example, if 5 and 1 are set as N and n respectively, then the selector 135 selects an input signal of input terminal 0 (h) shown in FIG. 15 and outputs it as a TSEN signal, and the test cell generating unit 101 generates and outputs one test cell during the time required for five cells to pass through the system. As a result, test cells covering one fifth of the band of the ATM system can be transmitted.

In the test cell generating operation, the above described enable signal ENB indicates "L" when a significant cell is entered from a circuit. Therefore, the operation of the 4-bit counter 133 and the selector 135 is interfered, and no test cells are generated. Thus, a test cell can be generated without affecting the transmission of significant cells.

Test cells of sixteen variations of bands can be generated in the above described embodiment using the counter 133 of the timing generating unit 102 as a 4-bit counter. If a 16-bit counter is used as the counter 133, then the generation patterns of test cells can further be varied.

Explained above is the test cell generating device of the test system according to the second aspect of the present invention. A test cell outputted by the test cell generating device can be detected by the test cell detecting device connected to an output line of the switch of the ATM system. The test cell detecting device monitors the VCI of an input cell, and recognizes the cell as a test cell when it detects a specific VCI provided by the test cell generating device. Then, the test cell detecting device extracts 16-bit test data stored at the head of the information portion of a test cell, and determines whether or not the values of the test data are in series. If yes, it is determined that all the test cells outputted by the test cell generating device have reached the test cell detecting device. Thus, it determines that no cells have been discarded. If no (the values are not in series), it is determined that some cells have been discarded at the switch due to congestion of cells etc.

Furthermore, the test system according to the second aspect of the present invention can comprise a buffer monitoring device for monitoring the buffer state of a switch.

As described above, according to the test system of the second aspect of the present invention, test cells of various bands can be generated, and conducted is a test of checking whether or not cells have been discarded due to the congestion of cells at the switch, and whether or not any cells have been lost at the trunk unit, etc. by transmitting test cells of various bands through the ATM system, thereby effectively testing the ATM system.

What is claimed is:

1. A test system operated in an ATM system for transmitting data in an ATM cell in an M-bit parallel format, comprising:

test cell generating means for outputting to the ATM system a test cell of a predetermined test data pattern of the M-bit parallel format, said test cell generating means generating n test cells when N input cells are detected, N>n, and detecting timing of an idle cell, and outputting one of the n test cells at the timing for detected idle cells, said test cells being generated in various bonds; and test cell confirming means for receiving the test cell from said ATM system, and confirming normal transmission of the test cell by detecting the predetermined test data pattern from the test cell.

2. The test system according to claim 1, wherein said format is an 8-bit parallel format.

3. The test system according to claim 1, wherein said test cell generating means comprises a VCI assigning circuit, and assigns to the test cell a VCI indicating that it is a test cell.

4. The test system according to claim 1, wherein said test cell confirming means are provided at a plurality of locations in said ATM system to confirm whether or not the test cell has been successfully transmitted between said test cell generating means and each of said test cell confirming means.

5. A test cell generating device used in an ATM system, comprising:

timing generating means for outputting a test cell generation instruction signal based on a ratio between two integers N and n N>n of optional values;

test cell generating means for generating a test cell and outputting said test cell according to the test cell generation instruction signal outputted by the timing generating means;

selecting means for selecting and outputting to an ATM switch one of the test cell outputted by said test cell generating means and a cell transmitted through a line, and a first counter keeping count only when an input idle cell has been detected.

6. A test cell generating device used in an ATM system, comprising:

timing generating means for outputting a test cell generation instruction signal based on a ratio between two integers N and n, N>n, of optional values;

test cell generating means for generating a test cell and outputting said test cell according to the test cell Generation instruction signal outputted by the timing generating means:

selecting means for selecting add outputting to an ATM switch one of the test cell outputted by said test cell generating means and a cell transmitted through a line and, said test cell generating means including a second counter for keeping count based on the test cell generation instruction signal, and inserting a counter value of the second counter at a predetermined area of the test cell.

7. A test cell generating device used in an ATM system, comprising:

timing generating means for outputting a test cell generation instruction signal based on a ratio between two integers N and n, N>n, of optional values;

test cell generating means for generating a test cell and outputting said test cell according to the test cell generation instruction signal outputted by the timing generating means; and selecting means for selecting and outputting to an ATM switch one of the test cell outputted by said test cell generating means and a cell transmitted through a line, said test cell generating means assigning to the test cell a VCI identifying a test cell.

8. A test cell generating device used in an ATM system, comprising:

timing generating means for outputting a test cell generation instruction signal based on a ratio between two integers N and n, N>n, of optional values;

test cell generating means for generating a test call and outputting said test cell according to the test cell generation instruction signal outputted by the timing generating means; and selecting means for selecting and outputting to an ATM switch one of the test cell outputted by said test cell generating means and a cell transmitted through a line, said timing generating means including:

a first flipflop circuit for setting "N", a second flipflop circuit for setting "n", a third counter for receiving the set value "N" from said first flipflop circuit and for counting a number of cell-frame signals in an input cell in N cycle, a decoder for decoding an output of said third counter and for outputting logical value 1 from k-th output terminal when a decoded value is k, an OR circuit group comprising a first OR circuit for receiving outputs from first and second output terminal of said decoder and an (i+1)th OR circuit for receiving an output of an i-th OR circuit and an output from (i+2)th output terminal of said decoder, and a selector for receiving the set value "n" from said second flipflop circuit, receiving at a first input terminal of said selector an output from a first output terminal of said decoder, receiving at a j-th input terminal of said selector an output of (j−1)th OR circuit in said OR circuit group, and outputting a signal received at a n-th input terminal of said selector as a test cell generation instruction signal (k=1, 2, 3, . . . , i=1, 2, 3, . . . , j=2, 3, 4, . . . ).

9. A test system, used in an ATM system, comprising:

a test cell generating device comprising:

timing generating means for outputting a test cell generation instruction signal based on a ratio between two integers N and n, N>n, of optional values, test cell generating means for generating a test cell and outputting it according to the test cell generation instruction signal outputted by the timing generating means, and selecting means for selecting and outputting to an ATM switch one of the test cell outputted by said test cell generating means and a cell transmitted through a line; and a test cell detecting device for detecting the test cell outputted by said ATM switch, a first counter keeping count only when an input idle cell has been detected.

10. A test system, used in an ATM system, comprising:

a test cell generating device comprising:

timing generating means for outputting a test cell generation instruction signal based on a ratio between two integers N and n, N>n, of optional values, test cell generating means for generating a test cell and outputting it according to the test cell generation instruction signal outputted by the timing generating means, and selecting means for selecting and outputting to an ATM switch one of the test cell outputted by said test cell generating means and a cell transmitted through a line; and a test cell detecting device for detecting the test cell outputted by said ATM switch, said test cell generating means including a second counter for keeping count, and inserting a counter value of the second counter at a predetermined area of the test cell, and said test cell detecting device determining whether or not data in the detected cell are assigned serial numbers.

11. A test system, used in an ATM system, comprising:

a test cell generating device comprising:

timing generating means for outputting a test cell generation instruction signal based on a ratio between two integers N and n, N>n, of optional values, test cell generating means for generating a test cell and outputting it according to the test cell generation instruction signal outputted by the timing generating means, and selecting means for selecting and outputting to an ATM switch one of the test cell outputted by said test cell generating means and a cell transmitted through a line; and a test cell detecting device for detecting the test cell outputted by said ATM switch, said test cell generating means assigning to the test cell a VCI identifying a test cell; and said test cell detecting device detecting the test cell by detecting a VCI identifying a test cell.

12. A test cell generating device as in claim 5, further comprising means for monitoring a state of a buffer of said ATM switch.

* * * * *